United States Patent
Beistegui Chirapozu et al.

(10) Patent No.: US 9,963,186 B2
(45) Date of Patent: May 8, 2018

(54) FOLDING BICYCLE

(71) Applicants: Jose Luis Beistegui Chirapozu, Vitoria-Gasteiz (ES); Javier Cuñado Landa, Vitoria-Gasteiz (ES)

(72) Inventors: Jose Luis Beistegui Chirapozu, Vitoria-Gasteiz (ES); Javier Cuñado Landa, Vitoria-Gasteiz (ES)

(73) Assignee: BHBIKES EUROPE, S.L., Vitoria-Gasteiz (Alava) (ES)

( * ) Notice: Subject to any disclaimer, the term of this patent is extended or adjusted under 35 U.S.C. 154(b) by 0 days. days.

(21) Appl. No.: 15/248,076

(22) Filed: Aug. 26, 2016

(65) Prior Publication Data
US 2017/0066495 A1 Mar. 9, 2017

(30) Foreign Application Priority Data

Sep. 3, 2015 (EP) .................................... 15382437

(51) Int. Cl.
*B62K 15/00* (2006.01)
*B62M 6/90* (2010.01)

(52) U.S. Cl.
CPC ...... *B62K 15/008* (2013.01); *B62K 2015/003* (2013.01); *B62M 6/90* (2013.01)

(58) Field of Classification Search
CPC .... B62K 15/00; B62K 15/006; B62K 15/008; B62K 2015/003; B62M 6/90
USPC ................................................ 280/278, 287
See application file for complete search history.

(56) References Cited

U.S. PATENT DOCUMENTS

| | | | | |
|---|---|---|---|---|
| 5,492,350 A | * | 2/1996 | Pan ...................... | B62K 15/006 280/278 |
| 2009/0317178 A1 | * | 12/2009 | Wang .................. | B62K 15/006 403/150 |
| 2010/0135715 A1 | * | 6/2010 | Huang ................. | B62K 15/006 403/83 |
| 2010/0212978 A1 | * | 8/2010 | Huang ................. | B62K 15/008 180/65.31 |

(Continued)

FOREIGN PATENT DOCUMENTS

| | | |
|---|---|---|
| CN | 202541772 | 11/2012 |
| EP | 2581298 | 5/2013 |

(Continued)

OTHER PUBLICATIONS

European Search Report issued by the European Patent Office dated Oct. 3, 2016 in connection with European Application No. EP 15382437.

*Primary Examiner* — Anne Marie M Boehler
(74) *Attorney, Agent, or Firm* — Gary J. Gershik; Cooper & Dunham LLP

(57) ABSTRACT

Allows a convenient, simple and compact folding, without requiring to remove any of the wheels, while occupying a minimal space in its maximum folded position. The folding bicycle (1) of the invention is characterized in that: the bar (11) has two articulation points (F1, F2), where each of said articulation points (F1, F2) has its own axis of rotation (A1, A2); the folding means comprise a pair of hinged attachments (110A, 110B), integrated in the bar (11) and connected to each of the articulation points (F1, F2); and where the pair of hinged attachments (110A, 110B) are separated from each other by a distance (D) in the longitudinal sense of the bar (11), at a position opposite to and facing each other.

15 Claims, 7 Drawing Sheets

(56) References Cited

U.S. PATENT DOCUMENTS

| | | | | |
|---|---|---|---|---|
| 2015/0042065 A1* | 2/2015 | Wang | ................... | B62K 15/008 |
| | | | | 280/287 |
| 2016/0016630 A1* | 1/2016 | Thompson | ............ | B62K 15/008 |
| | | | | 280/287 |
| 2016/0244120 A1* | 8/2016 | Gerencser | ............ | B62K 15/008 |

FOREIGN PATENT DOCUMENTS

| | | | | |
|---|---|---|---|---|
| ES | 1072110 | | 5/2010 | |
| GB | 1267674 | | 3/1972 | |
| GB | 2499586 | | 8/2013 | |
| JP | 2001 146188 | | 5/2001 | |
| NL | 1016175 | | 3/2002 | |
| WO | WO 03/022671 | | 3/2003 | |
| WO | 2015/156599 | * | 10/2015 | ............. B62K 15/00 |

* cited by examiner

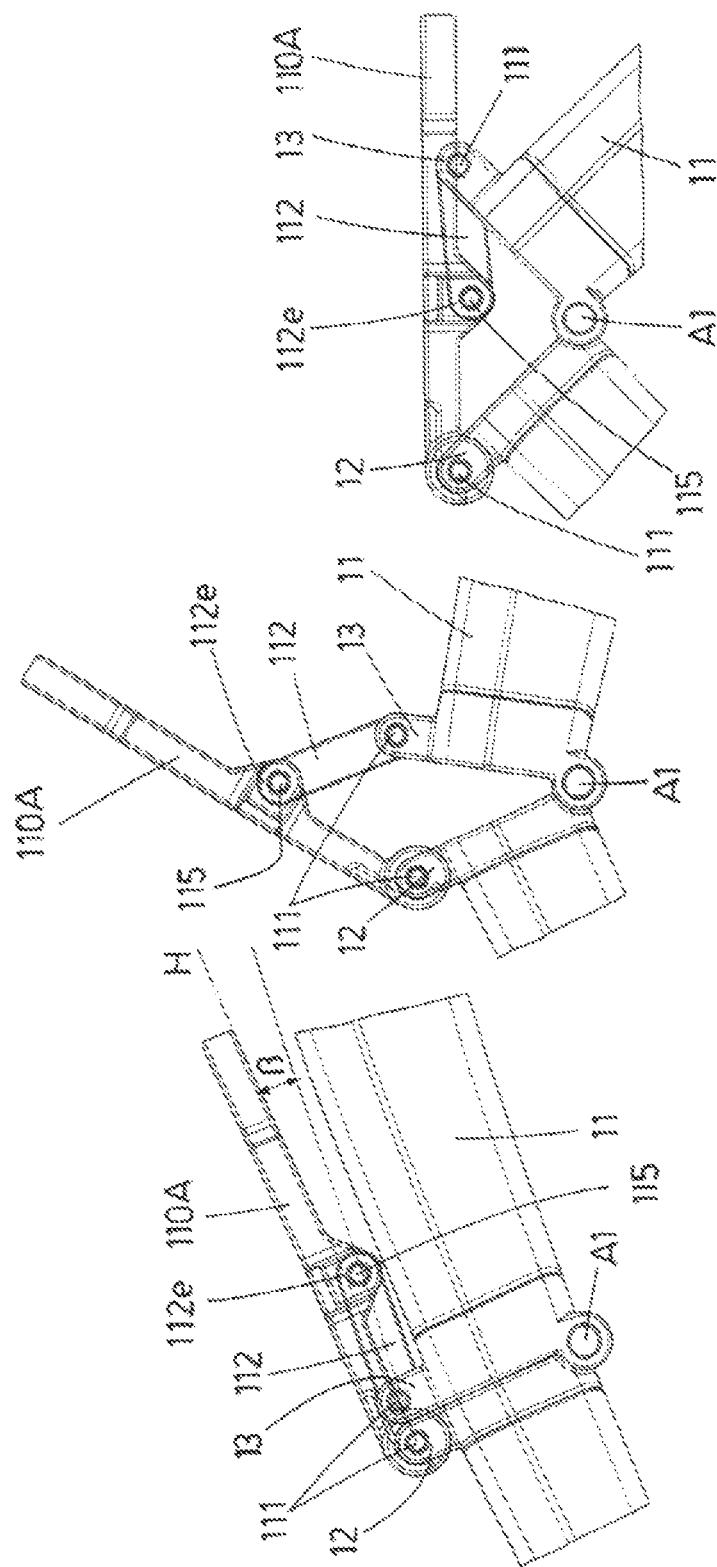

FOLDING BICYCLE

RELATED APPLICATIONS

This application claims priority of European Patent Application No. 153 82 437.0, filed Sep. 3, 2015, the entire contents of which are hereby incorporated by reference into this application.

OBJECT OF THE INVENTION

The present invention belongs to the field of folding bicycles, and more specifically folding bicycles with an electric pedal-assist motor.

The subject matter of the present invention is a folding bicycle that can be folded conveniently, simply and compactly without having to remove any of its wheels, while occupying a minimum volume in its maximum folded position, its two wheels being completely opposite each other in corresponding parallel planes.

BACKGROUND OF THE INVENTION

Bicycles, and more specifically pedal-assist bicycles, with an electric motor that assists the movement of the bicycle only when the rider is pedaling are currently well known. The power used to drive said electric motor is supplied by an electric battery.

These bicycles generally also comprise a hinge system on the diagonal or main tube of the frame allowing to fold the rear part of the bicycle sideways onto the front part thereof.

There are several models of pedal-assist bicycles in the market where the battery is located on the diagonal tube of the bicycle frame, such as in Utility Model ES1072110U, held by the author of the present invention, such that it is difficult if not impossible to install an articulated joint or hinge in the diagonal tube due to the presence of the battery.

Thus, to provide a folding capability to pedal-assist bicycles in which the battery is placed on the diagonal tube of the frame, folding systems have been conceived such as that described in international patent application WO0302267A1, which allows folding sideways the rear part of the bicycle onto the front part using a hinge fitted in the union of the diagonal tube to the seat tube. However, the drawback of the folding system is that the hinge is located at a point where many loads or strains coincide when the bicycle is being used, affecting the sturdiness of the system and making it prone to breaks and/or malfunctions, mainly due to clearances, friction and excessive wear of the components, substantially reducing the lifetime thereof.

In addition, application EP2581298A1, also by the holder, describes a folding bicycle that allows combining the inclusion of an electric battery on the diagonal tube of the frame and a folding system that reduces the loads applied at the weak points of the bicycle, such as the union points between the seat tube and the diagonal tube; however, this has the drawback of requiring removing the front wheel from its fork, thereby increasing the time, complexity and effort required in the folding process.

DESCRIPTION OF THE INVENTION

The present invention solves the aforementioned drawbacks with a folding bicycle that allows a convenient, simple and compact folding without requiring removing any of its wheels, thereby greatly reducing the time required for the folding operation, while occupying a minimum volume in its maximum folded position, with the two wheels completely opposite each other in parallel planes.

The folding bicycle of the invention is of the type comprising a front part comprised of a stem, a steering tube, and a front fork; a rear part comprising a rear fork; a frame connecting the front part and the rear part of the bicycle with at least one bar with a front end joined to the steering tube and a rear end joined to the rear fork; and folding means to allow folding the bicycle.

More specifically, the folding bicycle described herein has several specific features:
- the frame bar has two articulation points, where each articulation point has its corresponding axis of rotation,
- the folding means comprise a pair of hinged attachments integrated in the frame bar and connected to each of the articulation points, and
- the pair of hinged attachments are separated from each other by a distance in the longitudinal direction of the bar, at an opposite position facing each other.

Thus, the specific feature that the frame bar has two articulation points or folding areas allows forming two folding points in the bar, thereby obtaining three folding sectors in the bicycle: the rear part of the bicycle, the central part of the bar formed by the segment included between the two articulation points, and the front part of the bicycle. In this way the bicycle can be folded easily and compactly, avoiding any need to remove a wheel, thereby simplifying the task and saving significant time for the user.

In addition, the folding bicycle described herein implies, in its maximum folding position, a substantially smaller volume than current bicycles, such that portability, handling and transport thereof are clearly improved.

In addition, preferably the hinged attachments are oriented in parallel vertical planes and in a same angle, in the abscissa axis, opposite to the longitudinal axis of the bar, said angle preferably being 11.5°. This feature allows folding each of the three aforementioned segments in successive inclined planes, such that the bicycle can be perfectly folded to occupy a minimum volume, the front and rear wheels of the bicycle being opposite each other in parallel planes.

In addition, the folding bicycle of the invention can also be a pedal-assist bicycle with an electric motor coupled to either of the wheels, and an electric battery arranged in the bar of the frame, specifically at the distance separating the pair of quick lock attachments.

DESCRIPTION OF THE DRAWINGS

To complete the description being made, and in order to aid a better understanding of the characteristics of the invention, according to an example of a preferred embodiment thereof, a set of drawings are provided that form an integral part of this description where, for purposes of illustration and in a non-limiting sense, the following is shown:

FIGS. 7A, 7B, 7C are respectively side views of one of the hinged attachments of the bicycle in the initial unfolded position, an intermediate folding position, and the final maximum folded position.

PREFERRED EMBODIMENT OF THE INVENTION

An example of a preferred embodiment is described below, making references to the aforementioned figures, without this being meant to limit the scope of protection of the present invention in any way.

Figure 1:
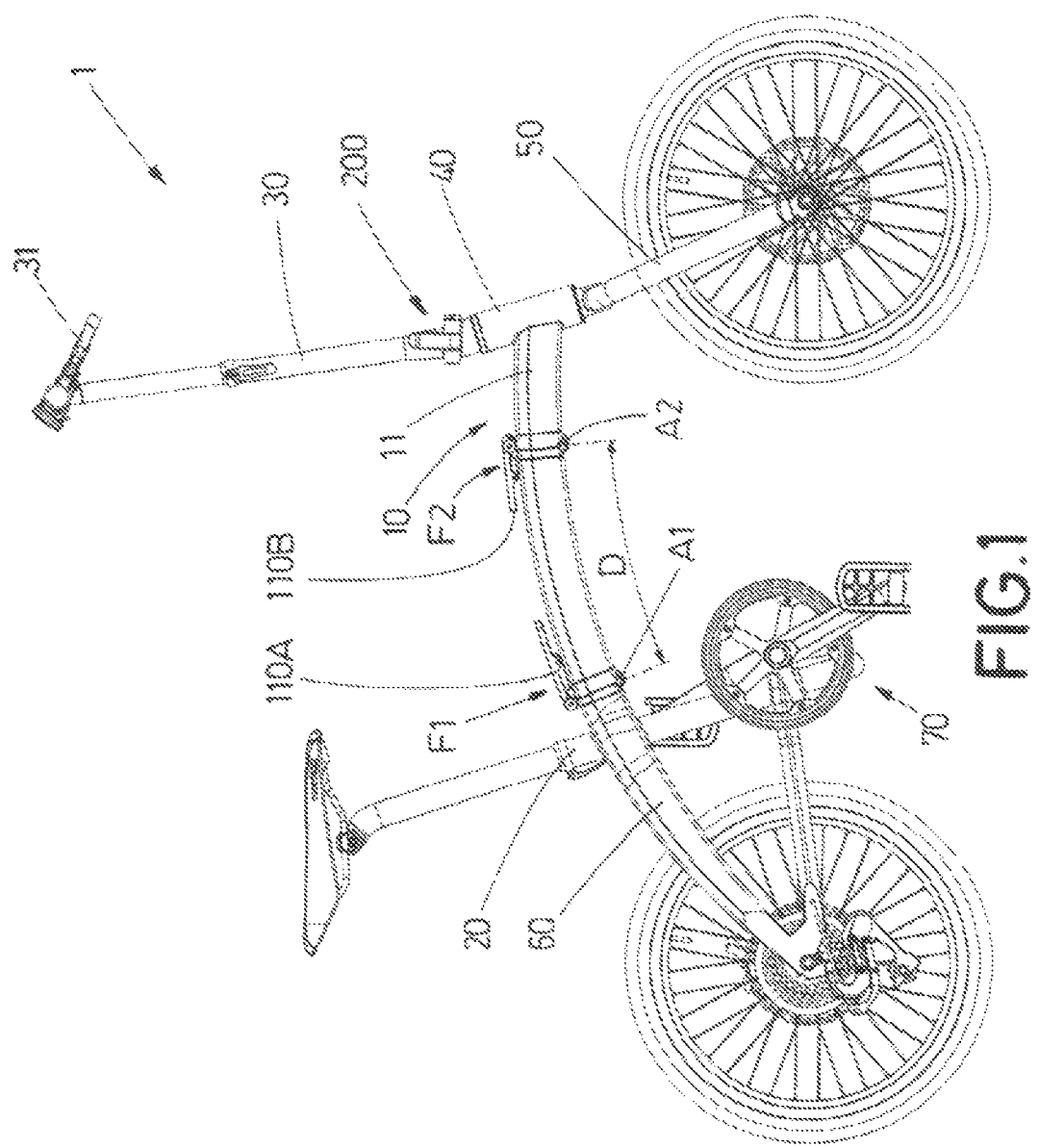
FIG. 1 is a side view of the folding bicycle of the invention, with the bicycle unfolded.

FIG. 1 shows a possible example of the folding bicycle (1) of the invention, which in this embodiment comprises:
- a front part formed by a stem (30) provided on the top with a handlebar (31), a steering tube (40) and a front fork (50);
- a rear part formed by a rear fork (60), a seat tube (20) and a bottom bracket (70);
- a frame (10) connecting the front part and the rear part of the bicycle (1), with at least one bar (11) having a front end joined to the steering tube (40) and a rear end connected to the rear fork (60); and
- folding means to allow folding the bicycle (1).

Figure 2:
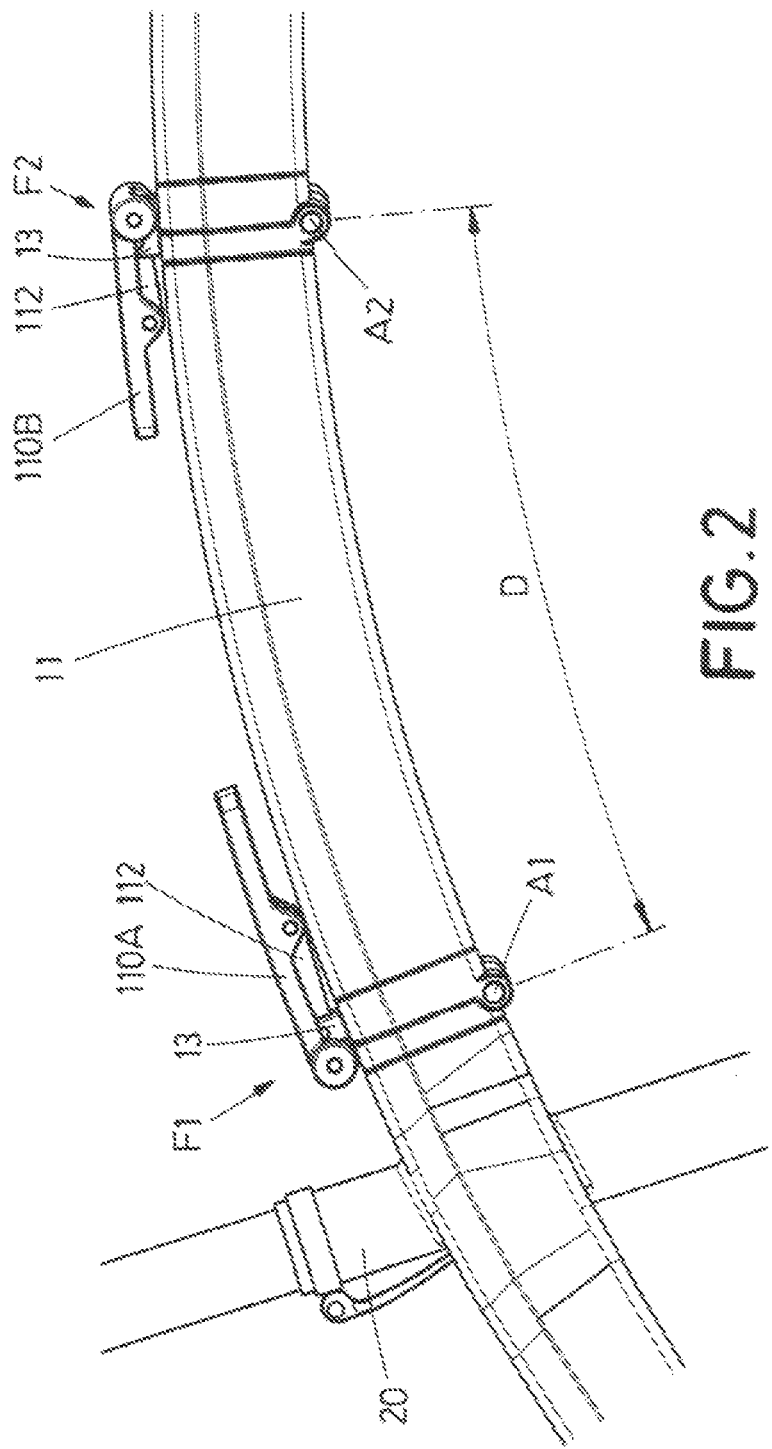
FIG. 2 is an enlarged view of the tube of the bicycle frame, showing the folding area in the unfolded position thereof.

In addition, FIGS. 1 and 2 show that the bar (11) of the frame (10) has two articulation points (F1, F2), where each one of the articulation points (F1, F2) has its corresponding axis of rotation (A1, A2).

It can also be seen that the folding means comprise a pair of hinged attachments (110A, 110B) integrated in the bar (11) and connected to each of the aforementioned articulation points (F1, F2).

Said hinged attachments (110, 110B) are separated by a distance (D) in the longitudinal direction of the bar (11), in a position opposite each other as shown in said FIGS. 1 and 2.

Figure 3:
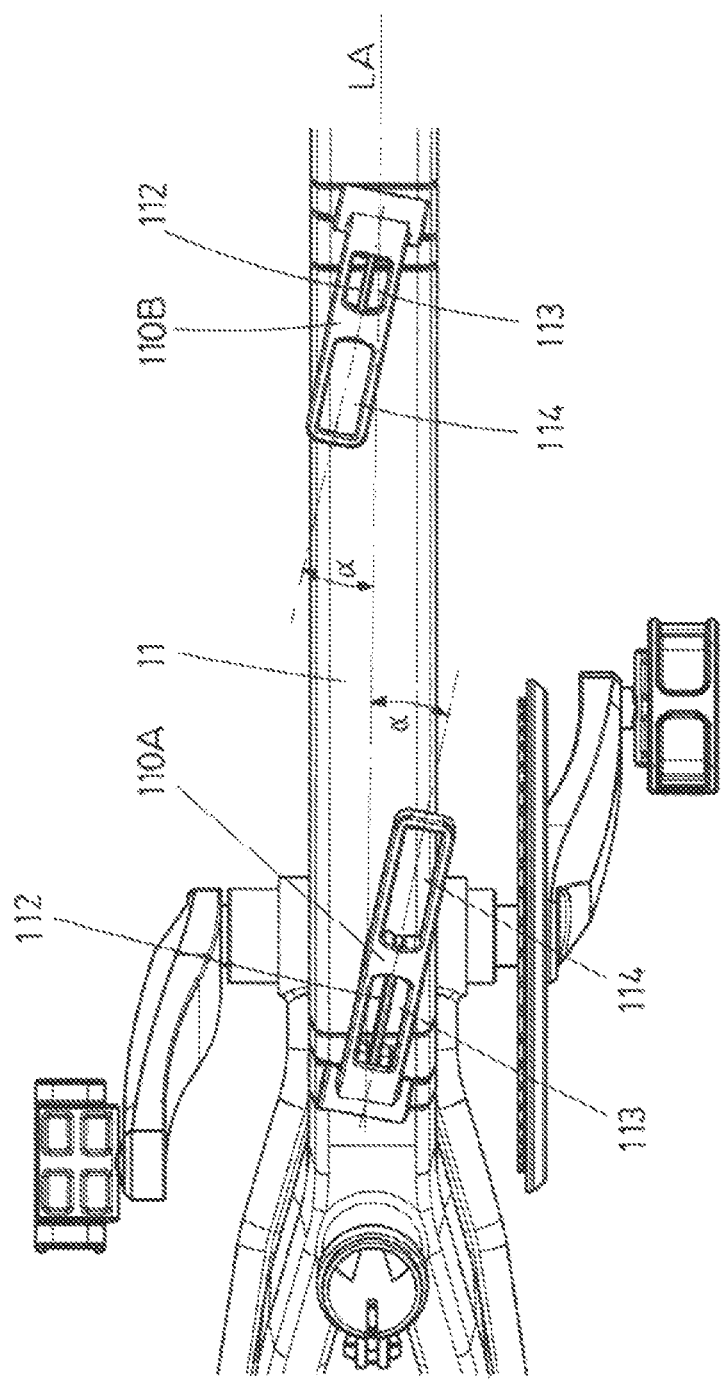
FIG. 3 is a plan view of FIG. 2 showing the opposite angle of each of the hinged attachments with respect to the longitudinal axis of the frame bar.
Figure 4:
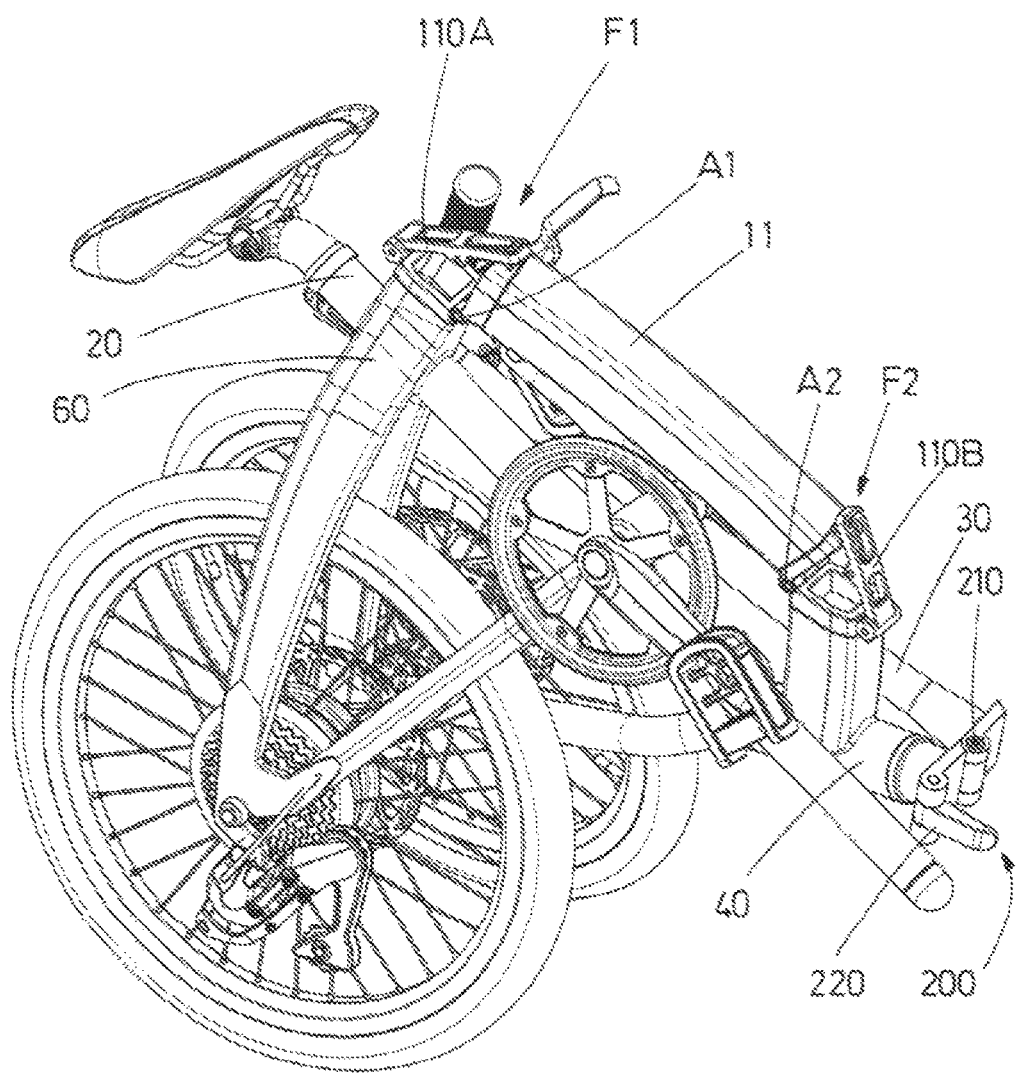
FIG. 4 shows a perspective view of the bicycle in a maximum folded position, the two wheels placed opposite each other in parallel planes.

FIG. 3 shows that the hinged attachments (110A, 110B) are in parallel vertical planes, in the same angle (α) to the abscissa axis, opposite to the longitudinal axis (LA) of the bar (11). This special feature allows the bicycle (1) to be folded easily in a spiral arrangement, without the folding parts touching due to being on the same plane. In this way the maximum folding of the bicycle is achieved with the wheels completely parallel and opposite each other, as shown in FIG. 4. Preferably, the angle (α) of each of the hinged attachments (110A, 110B) with respect to the longitudinal axis (LA) of the bar (11) is between 10 and 12°. More preferably, as shown in FIG. 3, said angle (α) is 11.5°.

FIG. 1 shows a first hinged attachment (110A) placed between the rear end of the bar (11) and a central point of the bar (11) in the longitudinal sense thereof; while a second hinged attachment (110B) is placed between the front end of the bar (11) and said central point of the bar (11).

Figure 6:
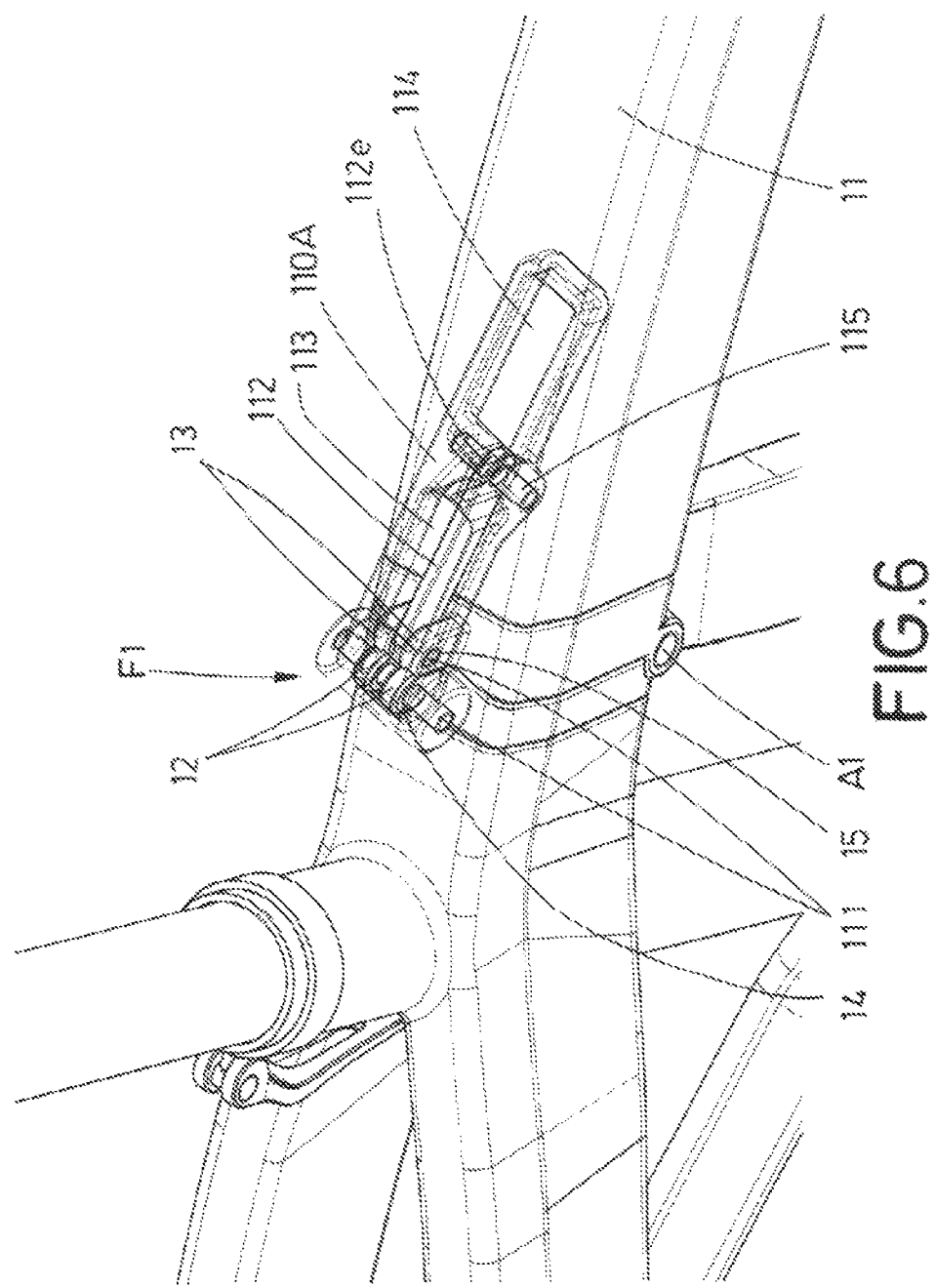
FIG. 6 is an enlarged view of one of the hinged attachments, specifically the rear hinged attachment, nearest the seat tube, showing the internal components thereof.

FIG. 6 shows the articulation points (F1) of the bar (11) comprising lugs (12, 13) that protrude vertically upward, to which the hinged attachments (110A, 110B) are coupled. Said lugs (12, 13) have through orifices (14, 15) on their surface and are located on the end upper face of each segment of the bar (11) so that they are separated in the folded position of the bicycle (1).

In this example of a preferred embodiment, the pair of hinged attachments (110A, 110B) comprise revolving bushings (111) for the insertion and joint rotation with the through orifices (14, 15) of each lug (12, 13), and are also provided with an eccentric rod (112) that connects one of the lugs (13) to a central sector of said hinged attachments (110A, 110B), as shown in FIGS. 2, 6 and 7A-7C. It should be noted that the distal end (112e) of said eccentric rod (112) also includes a through orifice in which is inserted a transverse bushing (115). More specifically, said eccentric rod (112) connects the lug (13) that is farthest from each of the front and rear ends of the bar (11) of the frame (10), see FIG. 6.

FIGS. 7A, 7B, 7C show the position of one of the hinged attachments (110A) in various folding positions of the bicycle (1).

Thus, in a first unfolded position of the bicycle (1), shown in FIG. 7A, the lugs (12, 13) touch each other. In addition, in this unfolded position it can be seen that the eccentric rod (112) has a negative inclination angle (β) with respect to a horizontal axis (H) of the rest of the hinged attachment (110A). Placing the eccentric rod (112) at a negative inclination angle (β) with respect to the horizontal axis (H) allows the hinged attachments (110A, 110B) to tighten such that they cannot become loose in the use position of the bicycle (1). Preferably, said inclination angle (β) is from 4 to 6°. More preferably, said inclination angle (β) in the present example is 5°, as shown in FIG. 7A.

In the intermediate folding position shown in FIG. 7B, the hinged attachment (110A) has an inverted Y shape, the eccentric rod (112) turning in an anticlockwise direction, while the segments of the bar (11) are separated by the corresponding rotation axis (A1).

In the folded position of the bicycle (1) shown in FIG. 7C, the lugs (12, 13) are separated from each other, where the distal end (112e) of the eccentric rod (112) is located between the two lugs (12, 13).

Figure 5:
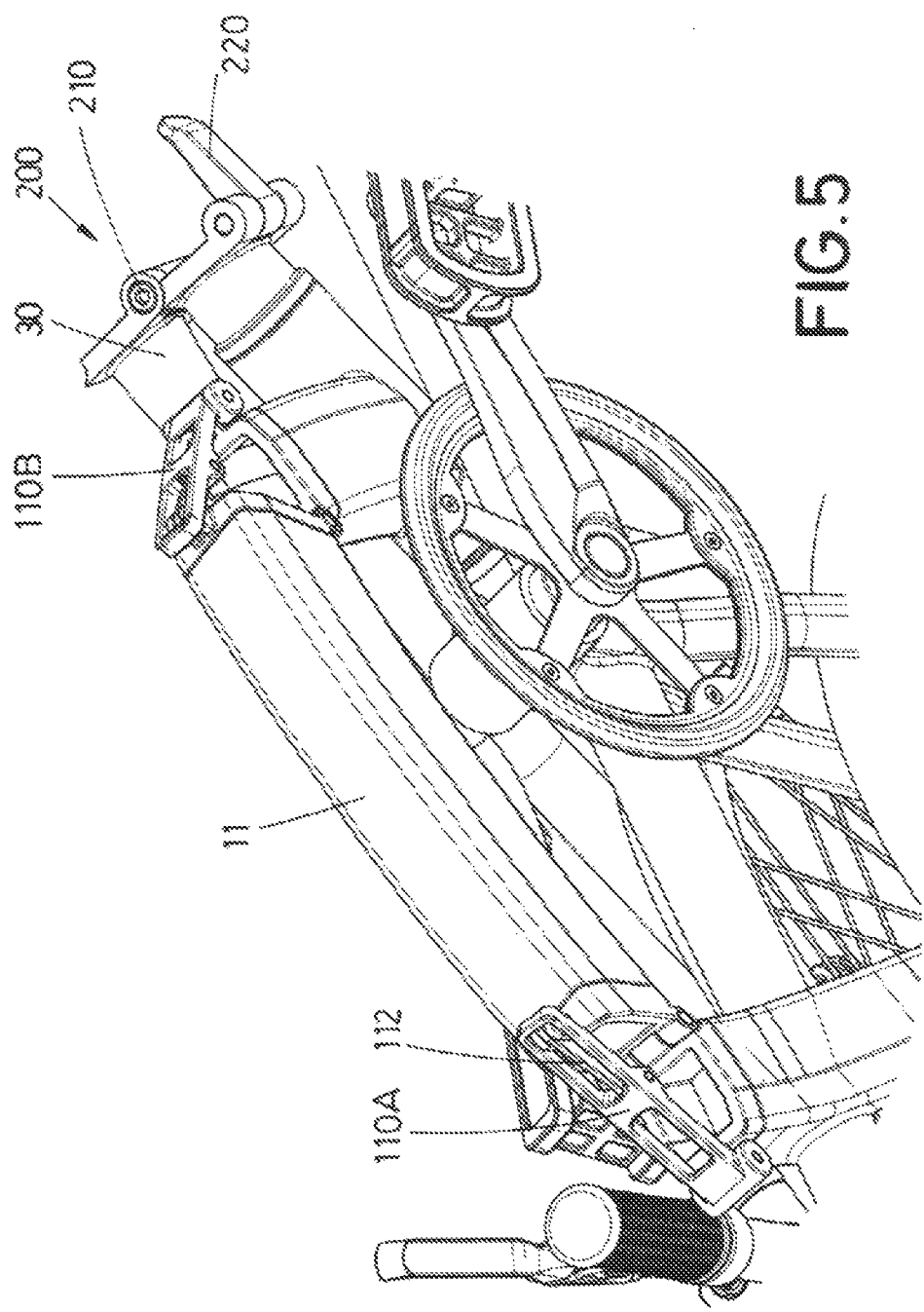
FIG. 5 is an enlarged view showing the folding area of the bicycle in the maximum folded position thereof.

According to the present preferred embodiment, the stem (30) further comprises secondary folding means (200), shown in FIGS. 4 and 5, provided with an intermediate rotation shaft (210) and a locking lever (220) allowing said stem (30) to turn 180°. This allows the bicycle (1) to be folded maximally, occupying a minimal space, as said stem (30) is folded and rotated on a plane parallel to that of the bicycle wheels (1), as shown in FIGS. 4 and 5.

FIGS. 3, 6, and 7A-7C show that the hinged attachments (110A, 110B) have a flat, rectangular shape, narrower than the width of the bar (11), and have at least two hollow recesses (113, 114). Said hollow recesses (113, 144) simplify holding and handling by the user and prevent a substantial weight increase due to said parts, as well as reducing manufacturing material costs.

The invention claimed is:
1. A folding bicycle (1) comprising
a front part comprised of a stem (30), a steering tube (40) and a front fork (50);
a rear part comprised of a rear fork (60);
a frame (10) connecting the front part and the rear part of the bicycle (1) comprising at least one bar (11), the at least one bar (11) including:
a front end joined to the steering tube (40) and a rear end joined to the rear fork (60),
first and second articulation points (F1, F2) having their own corresponding axis of rotation (A1, A2), and
first and second hinged attachments (110A, 110B) each having a distal end and a proximal end and integrated in the at least one bar (11),
the proximal end of the first hinged attachment (110A) being connected to the first articulation point (F1)

and the proximal end of the second hinged attachment (110B) being connected to the second articulation point (F2) so as to enable folding the bicycle (1),
    wherein the first and second hinged attachments (110A, 110B) are arranged in parallel vertical planes, and the distal end of the first hinged attachment (110A) and the distal end of the second hinged attachment (110B) are on different sides of a longitudinal axis (LA) of the at least one bar (11),
    wherein the proximal end of the first hinged attachment (110A) and the proximal end of the second hinged attachment (110B) are separated by a distance (D) along a longitudinal direction of the at least one bar (11), and
    wherein the articulation points (F1, F2) of the bar (11) comprise lugs (12, 13) that protrude vertically upward, to which the hinged attachments (110A, 110B) are coupled.

2. The folding bicycle (1) according to claim 1, wherein the first hinged attachment (110A) is placed between the rear end of the bar (11) and a central point of the bar (11) in the longitudinal direction thereof, and the second hinged attachment (110B) is placed between the front end of the bar (11) and said central point of the bar (11).

3. The folding bicycle (1) according to claim 1, wherein the lugs (12, 13) have through orifices (14, 15) on their surface and are located on an end upper face of each segment of the bar (11) such that the lugs (12, 13) are separated in the folded position of the bicycle (1).

4. The folding bicycle (1) according to claim 3, wherein the first and second hinged attachments (110A, 0.110B) comprise revolving bushings (111) for the insertion and joint rotation with the through orifices (14, 15) of each lug (12, 13), and are also provided with an eccentric rod (112) that connects one of the lugs (13) to a central sector of said hinged attachments (110A, 110B).

5. The folding bicycle (1) according to claim 4, wherein in the unfolded position of the bicycle (1) the lugs (12, 13) are placed close to each other and in contact, while in the folded position of the bicycle (1) the lugs (12, 13) are separated from each other, where one distal end (112e) of the eccentric rod (112) is placed between the two lugs (12, 13).

6. The folding bicycle (1) according to claim 4, wherein in the unfolded position of the bicycle (1), the eccentric rod (112) has a specific angle of inclination (13) with respect to an axis (H) of the rest of the hinged attachment (110A, 110B).

7. The folding bicycle (1) according to claim 6, wherein the specific angle of inclination (β) between the eccentric rod (112) and the axis (H) of the rest of the hinged attachment (110A, 110B) is from 4 to 6°.

8. The folding bicycle (1) according to claim 7, wherein the specific angle of inclination (β) is 5°.

9. The folding bicycle (1) according to claim 8, wherein the bicycle (1) is a pedal-assist bicycle comprising an electric motor coupled to either wheel of the bicycle (1) and an electric battery placed on the bar (11) of the frame (10), specifically at the distance (D) separating the proximal end of the first hinged attachment (110A) and the proximal end of the second hinged attachment 110B.

10. The folding bicycle (1) according to claim 1, wherein the stem (30) additionally comprises secondary folding means (200) that have an intermediate rotation shaft (210) and a locking lever (220) to allow said stem (30) to turn 180°.

11. The folding bicycle (1) according to claim 1, wherein the first and second hinged attachments (110A, 110B) have a flat, rectangular shape, narrower than the width of the bar (11), and have at least two hollow recesses (113, 114).

12. The folding bicycle (1) according to claim 1, wherein an angle (α) of each of the first and second hinged attachments (110A, 110B) with respect to the longitudinal axis (LA) of the bar (11) is between 10 and 12°.

13. The folding bicycle (1) according to claim 12, wherein the angle (α) is 11.5°.

14. The folding bicycle (1) according to claim 1, wherein the first hinged attachment (110A) is placed between the rear end of the bar (11) and a central point of the bar (11) in the longitudinal direction thereof, and the second hinged attachment (110B) is placed between the front end of the bar (11) and said central point of the bar (11).

15. The folding bicycle (1) according to claim 1, wherein the bicycle (1) is a pedal-assist bicycle comprising an electric motor coupled to either wheel of the bicycle (1) and an electric battery placed on the bar (11) of the frame (10), specifically at the distance (D) separating the proximal end of the first hinged attachment (110A) and the proximal end of the second hinged attachment 110B.

* * * * *